United States Patent

Saylak et al.

[15] 3,650,858

[45] Mar. 21, 1972

[54] SURFACE TREATMENT PROCESS FOR SOLID ROCKET PROPELLANT COMPOSITION

[72] Inventors: Donald Saylak, Lancaster; Arthur E. Karabela, Edwards, both of Calif.

[73] Assignee: The United States of America as represented by the Secretary of the Air Force

[22] Filed: Feb. 24, 1970

[21] Appl. No.: 15,321

[52] U.S. Cl. ................................. 149/109, 149/19, 149/20, 149/42, 149/44
[51] Int. Cl. ........................................................ C06b 19/00
[58] Field of Search ...................... 149/109, 42, 7, 44, 19, 20

[56] References Cited

UNITED STATES PATENTS 3,539,377  11/1970  Steinle ................................... 149/7 X Primary Examiner—Carl D. Quarforth
Assistant Examiner—Stephen J. Lechert, Jr.
Attorney—Harry A. Herbert, Jr. and William J. O'Brien

[57] ABSTRACT

A process for extending the storage and environmental capabilities of cured polymers by depositing an age retardant agent on the surface of the polymer. An age retardant agent such as a plasticizer or antioxidant is dissolved in a low boiling point swelling agent which is compatible with the plasticizer and acts as a solvent therefor. The plasticizer-solvent mixture is then applied to the surface of the polymeric structure, such as a solid propellant rocket motor, in a conventional manner. For example, the solvent mixture can be applied by painting or dipping the structure. The solvent acts as a carrying agent for the plasticizer allowing it to penetrate the surface of the structure to a desired depth.

1 Claims, 2 Drawing Figures ic materials. In a more particular manner, this invention concerns itself with a process for selectively depositing an age retardant agent, such as a plasticizer, onto desired areas of a highly filled polymeric material, such as a solid propellant rocket motor.
SURFACE TREATMENT PROCESS FOR SOLID ROCKET PROPELLANT COMPOSITION

BACKGROUND OF THE INVENTION

This invention relates to the surface treatment of cured polymeric materials. In a more particular manner, this invention concerns itself with a process for selectively depositing an age retardant agent, such as a plasticizer, onto desired areas of a highly filled polymeric material, such as a solid propellant rocket motor.

It is well known that bulk samples of organic polymeric structures do not possess the necessary structural integrity that allows them to function for long periods of time under environmental conditions of stress and strain. Solid propellant rocket motors are formulated using various polymeric materials and the severe stresses and strains imposed on these polymers often cause them to crack thereby minimizing their effectiveness.

The use of plasticizers or antioxidants have been suggested heretofore in an attempt to achieve greater deformability in polymeric materials and improve their effectiveness as structural elements. Generally, these additives are placed into the polymer formulation during preparation. In the case of propellant preparation, the plasticizer takes up the volume which could be used by the polymer and constituents thereof thus compromising the ballistic performance in order to improve polymeric deformability. Furthermore, the inclusion of the plasticizer in the basic formulation does not provide a sufficiently high degree of resistance to surface cracking and the resulting propagation of large fractures.

In attempting to overcome the difficulties and disadvantages prevalent in previous attempts to treat polymeric materials and provide for solid propellant stress relief, it has been found that a mixture of a solvent and a compatible plasticizing oil can improve the physical and ballistic properties of a composite solid propellant. The mixture is deposited onto desired surface areas of the propellant material in a conventional manner, such as by painting, dipping, flooding or submerging the propellant structure in the plasticizer-solvent mixture.

The solvent is a low boiling point material which acts as a gentle swelling agent and as a carrier for the plasticizer. The plasticizer material is not capable of penetrating the surface of a cured polymeric material within a practical rate. However, with the aid of the solvent, the plasticizer quickly penetrates the polymeric surface to any desired depth depending upon the exposure time. When the desired depth of penetration is achieved, the solvent is evaporated off, leaving a layer rich in plasticizer. The process permits existing cured polymeric materials to perform structurally beyond their capability by tailoring their surface characteristics to achieve greater resistance to fracture. The improvement is achieved by increasing the deformability of the polymer, in the case of plasticizers, or by increasing the polymers resistance to oxidative degradation in the case of antioxidants.

The present method also permits the selective deposition of plasticizer materials at only the highly stressed or strained regions. This can be achieved after polymer cure and thus provides for an optimized design. In cases of age hardening, the softened texture can be restored and the storage life of the material extended. Since antioxidants are often added to propellant formulations, the deposition of additional antioxidant to the surface of an antioxidant-containing cured propellant can regenerate the depleted antioxidant and thus slow down the aging process.

SUMMARY OF THE INVENTION

In accordance with the present invention, it has been found that the extensibility and long term storage capabilities of cured polymeric materials can be improved by a technique which involves depositing an age retardant agent, such as a plasticizer or antioxidant, or a combination of both, onto the surface of the cured polymer. The technique is especially useful for improving the resistance to fracture of solid propellant rocket motors. The age retardant agent, such as a plasticizer, is dissolved in a compatible low boiling point solvent in a ratio of from about one to two parts by volume of solvent to about one to seven parts by weight of the surface treating agent. The solvent-plasticizer mixture is then deposited onto the surface of the polymer and allowed to remain there for a period of time sufficient to achieve a predetermined depth penetration of the plasticizer into the body of the polymeric substrate. When the desired depth of penetration is achieved, the solvent is evaporated off under vacuum, leaving a layer of plasticizer or antioxidant within the top portion of the polymeric body. A ratio of about one part solvent to about one to two parts of plasticizer has been found preferable.

In treating polymeric structures, conventional antioxidants and plasticizers may be utilized as the surface treating agent. For example, a low molecular weight plasticizing naphthenic type oil, commercially available as "Circo-Light Oil," mixed in a low boiling point solvent, such as dichlorodifluoro methane has proven to be most effective. By using this solution as a surface treating material, a high degree of resistance to fracture in cured solid propellant formulations can be achieved.

Accordingly, the primary object of this invention is to provide a process for extending the storage and environmental capabilities of polymeric structures, particularly solid propellant rocket motors.

Another object of this invention is to provide a process for incorporating plasticizers, antioxidants and other age retardant additives into a cured polymeric structure to provide the structure with a layer having a high concentration of the additive agent.

Still other objects and advantages of the present invention will become readily apparent upon consideration of the following detailed description thereof when taken in conjunction with the accompanying drawings.

DESCRIPTION OF THE PREFERRED EMBODIMENT

Figure 1:
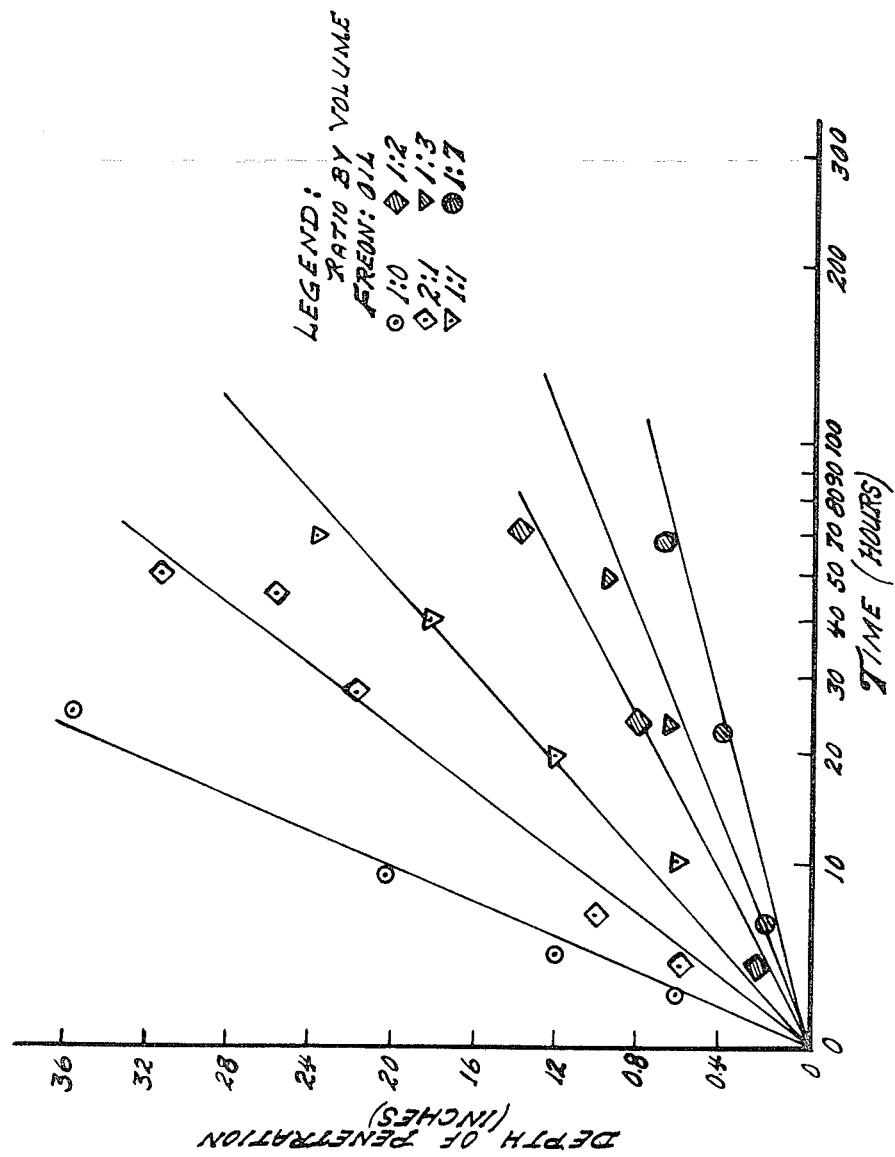
FIGS. 1 and 2 are graphical representations demonstrating the beneficial effects derived from the process of this invention.

The present invention involves a process for treating the surfaces of a cured polymeric structure with a solvent mixture of a plasticizer, antioxidant or other age retardant material. The solvent performs as a carrying agent permitting the plasticizer, or other additive, to penetrate the surface of the cured polymer. The solvent is then evaporated off leaving a portion of the polymeric structure with a high concentration of plasticizer.

The carrying agent is a penetrating, somewhat volatile solvent, such as Freon-11. The surface treating agent is a low molecular weight plasticizing compound, such as "Circo-Light Oil," that is soluble in the solvent. Mixture ratios of these two ingredients can be optimized based on desired property improvements. However, a ratio of from about one part by weight Freon-11 to about one to two parts by weight of "Circo-Light Oil" is preferred. No special tools or equipment are required to make up the mixtures or to treat the propellant. The propellant is treated with the chosen mixture ratio of treatment fluid by direct contact until the desired depth of penetration is obtained. The propellant is dried under vacuum, a process that eliminates the volatile solvent and leaves the plasticizer in the propellant. In addition to a plasticizer, antioxidant, or anti ozone material, other age retardants can be deposited by this technique providing the solubility in the penetrant is excellent. In order to achieve separation, their boiling point must be higher than the solvent. The selection of the plasticizer is made such that once the penetration depth is achieved, no additional migration will be incurred.

Since Freon-11 has a low vapor pressure, it does not cause propellant dewetting, but acts as a gentle swelling agent and as a carrier for the Circo-Light oil. This oil, which is often used as a plasticizer in rubber processing and in propellant formulations for enhancing strain capability, will not readily penetrate a cured propellant without a suitable transporting agent. A mixture of Freon-11 and this oil enables the deposition of the oil to any desired depth into the propellant based on exposure time. Once the solution is deposited on the desired area of the propellant grain, the Freon is removed under vacuum, leaving a layer rich in plasticizing oil and possessing an increased strain capability.

Freon-11 is a Dupont trade name for dichloro, difluoromethane while Circo-Light is a trade name for Sunaco's Naphthenic type rubber process oil.

As was stated heretofore, the proposed treatment fluid utilizes a mixture of Freon-11 and Circo-Light oil. Freon-11 (trichlorofluoromethane) is a volatile (b.p. 74.7° F.), virtually odorless, nonflammable, colorless liquid of great stability. It is used principally as a refrigerant and as an insecticide solvent in aerosol bombs, and in this invention as a carrier for the Circo-Light oil. Circo-Light oil is a heterogeneous oil mixture of 20 percent aromatic, 39 percent naphthenic and 41 percent paraffinic constituents. Its molecular weight is approximately 2.5 times that of the Freon-11 and it is much less volatile. Both of these factors facilitate the removal of Freon-11 from a treated propellant, leaving behind only Circo-Light oil. The oil is compatible with all the constituents of the propellant used to test the solution treatment of this invention. Compatibility also exists between Freon-11 and the propellant, with the latter being only slightly swelled by this solvent. The Circo-Light oil is completely miscible with Freon-11, and very stable solutions can be made at numerous mixture ratios. No separation of the two ingredients occurred in any of the prepared mixtures following several weeks of storage. However, because of the volatility of Freon-11, the solutions must be stored, sealed and kept cool to prevent a change in mixture ratio.

The order of mixing for the treatment solution is Freon-11 to the oil. In addition, the temperature of application is designated as room temperature and application times are in accordance with those disclosed in FIG. 1 of the drawing. Normally, 24 hours at room temperature and approximately 21 inches of vacuum are adequate to evaporate the Freon-11 after sufficient penetration is achieved. The composition of the conventional propellant used as the substrate for the treatment solution of this invention is set forth in Table I. The composition is an approximate formulation by weight percent.

TABLE I

| PBAN polymer | (polybutadiene, acrylic acid, acrylonitule terpolymer) | 13% |
| --- | --- | --- |
| ECA epoxy curing agent | | 2% |
| Ammonium perchlorate | (oxidizer) | 70% |
| Aluminum powder | (fuel) | 15% |

Six mixtures of the solution of this invention were prepared for initial testing covering the range (Freon-11 to oil), 2:1 up to 1:7 parts by volume. The first series of tests involved determining the rate of penetration of various mixture ratios into the cured propellant of Table I. Cylindrical samples of the propellant (½ inch diameter by 1 inch long) were immersed into sealable sample jars filled with the various mixtures. Samples were withdrawn at several intervals of time from each of the jars. A cross section was then cut from the samples and observation made under a stereo-microscope at approximately 20X magnification. Using an ultraviolet (UV) light source direct measurement of the depth of penetration of oil was possible because of the fluorescence of oil under UV. What appeared under the microscope was a fluorescent ring showing a smooth, even penetration of the mixture into the propellant. FIG. 1 represents the data obtained by this technique.

In order to obtain more convincing evidence under motor-like conditions, an analogue motor cold soak-to-failure test program was conducted. Twelve analogue motors were produced from the propellant of Table I. Two mixture ratios were chosen for this testing — 1:1 and 1:2 (F/O by volume). Failure was established as the first appearance of a crack or several surface voids (in these motors all cracks occurred at the apex of the V-notch). Motors were inspected daily with a borescope. It should be noted that the treated motors were penetrated to 0.125 inch, as shown by the curves in FIG. 1. The cold-soak schedule utilized is shown in Table II.

TABLE II

Analogue Motor Cold Soak Schedule

| Temp. F. | | Time (days) | Total Time at Temp.(days) |
| --- | --- | --- | --- |
| 77° F. | (Room Temperature) | 1(Start) | 1 |
| 40° | | 3 | 2 |
| 30° | | 4 | 1 |
| 20° | | 6 | 2 |
| 10° | | 8 | 2 |
| 0° | | 10 | 2 |
| −10° | | 14 | 4 |
| −20° | | 18 | 4 |
| −30° | | 23 | 5 |

Figure 2:
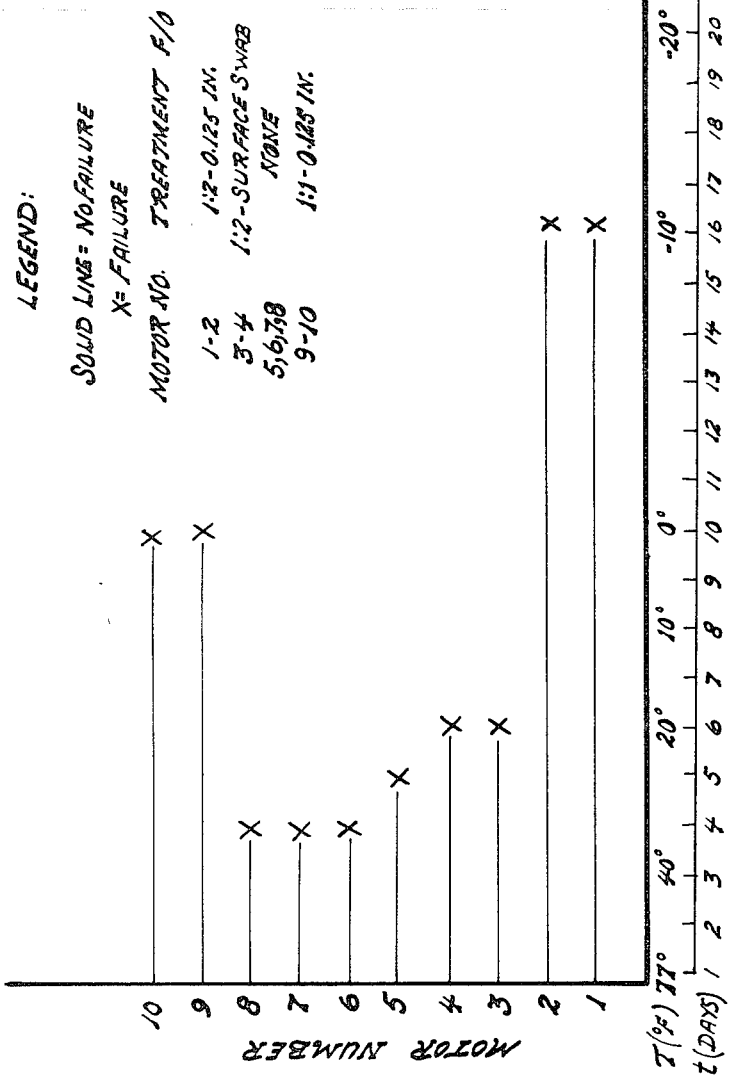

FIG. 2 shows the results of the cold-soak program and demonstrates the significant beneficial effects to be derived from the treatment of this invention. What the figure does not show is that in addition to delaying the onset of propellant cracking, the treatment retards the growth of defects once formed. This fact was brought to light when all motors with cracked grains were made to continue into the cold-soak program. In all cases those defects formed in the untreated motors continued to grow whereas the cracks in the treated motors maintained their hairline dimensions.

From a consideration of the foregoing, it becomes obvious that the present invention provides a novel technique for improving the strain capability of exposed propellant surfaces. The surface characteristics of the propellant structure are tailored to achieve greater resistance to cracking and the degradative effects of oxidation thereby extending the storage and environmental capabilities of solid propellant formulations.

Although the invention has been described with reference to particular embodiment, it will be understood to those skilled in the art that the invention is capable of a variety of alternative embodiments within the spirit and scope of the appended claims.

We claim:

1. A process for extending the storage and environmental capabilities of a solid, polymeric, rocket propellant which comprises the steps of applying to the surface of said solid propellant an age retardant mixture consisting essentially of trichlorofluoromethane and a compatible plasticizing agent in a ration of from about 1:1 to 1:2, allowing said mixture to remain in contact with said propellant surface for a period of time sufficient to achieve a desired depth of penetration of the plasticizer into the surface of the propellant and then evaporating said trichlorofluoromethane under vacuum.

* * * * *